United States Patent
Sirles

[11] 3,811,512
[45] May 21, 1974

[54] MUD CLIP FOR A HORSESHOE

[76] Inventor: Robert A. Sirles, 2873 Mary St., Omaha, Nebr. 68112

[22] Filed: Oct. 5, 1972

[21] Appl. No.: 295,132

[52] U.S. Cl. .............................................. 168/34
[51] Int. Cl. .............................................. A01i 7/04
[58] Field of Search .............. 168/34, 32, 31, 11

[56] References Cited
UNITED STATES PATENTS

| | | | |
|---|---|---|---|
| 869,962 | 11/1907 | Distler | 168/34 |
| 895,533 | 8/1908 | Bartlett | 168/31 |
| 1,184,476 | 5/1916 | Miller | 168/34 |

Primary Examiner—Robert Peshock
Assistant Examiner—J. Q. Lever
Attorney, Agent, or Firm—Zarley, McKee & Thomte

[57] ABSTRACT

A mud clip for a horseshoe is disclosed comprising a base portion having a lug protruding therefrom. The base portion embraces the quarter portion of the horseshoe and is maintained thereon by a horseshoe nail extending through the clip and the horseshoe.

8 Claims, 4 Drawing Figures

PATENTED MAY 21 1974 3,811,512
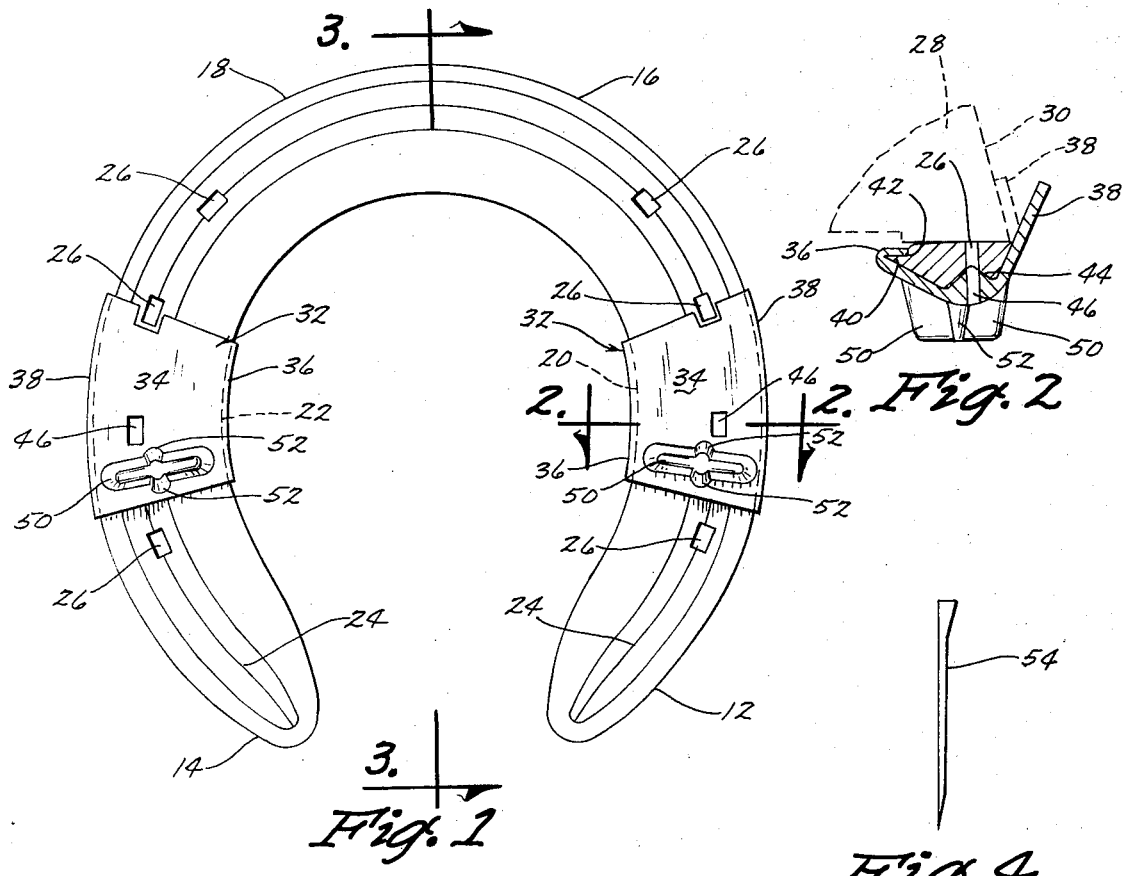
Fig. 1
Fig. 2
Fig. 4
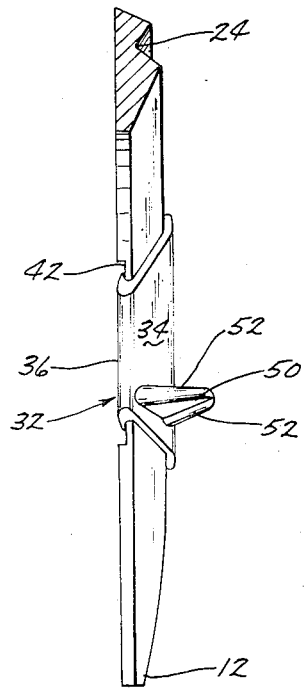
Fig. 3

MUD CLIP FOR A HORSESHOE

Varying track conditions require different horseshoes to be used on the race horses. In other words, a muddy track requires a particular type of horseshoe while a fast track will require a different type of horseshoe. If the track condition changes, it is necessary to remove the horseshoes from the horse and replace the same with the proper horseshoe. This procedure is not only time consuming and expensive, it is also detrimental to the hooves of the horse.

Therefore, it is a principal object of this invention to provide a mud clip for a horseshoe.

A further object of the invention is to provide a mud clip for a horseshoe which is easily installed and removed therefrom.

A further object of the invention is to provide a mud clip for a horseshoe which provides increased traction for the horse.

A further object of the invention is to provide a mud clip for a horseshoe which may be mounted on a horseshoe by means of a single nail.

A further object of the invention is to provide a mud clip for a horseshoe which is mounted on the quarter portion thereof.

A further object of the invention is to provide a mud clip for a horseshoe which has means thereon to positively maintain the same thereon.

A further object of the invention is to provide a mud clip for a horseshoe which eliminates the necessity of completely removing the horseshoe from the horse if a muddy track is encountered.

A further object of the invention is to provide a mud clip for a horseshoe which is economical in manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a plan view of a horseshoe having a pair of mud clips mounted thereon:

FIG. 2 is a sectional view of the mud clip as seen along lines 2—2 of FIG. 1:

FIG. 3 is a sectional view seen along lines 3—3 of FIG. 1; and

FIG. 4 is a plan view of a shoe nail.

In the drawings, the numeral 10 refers generally to a horseshoe having an outside heel portion 12, inner heel portion 14, outer toe portion 16, inner toe portion 18, outer quarter portion 20 and inner quarter portion 22. Horseshoe 10 is also provided with a V-shaped full ring 24 formed therein and a plurality of nail holes 26 extending therethrough. The numeral 28 refers generally to the hoof of the horse having a side wall 30.

The mud clip of this invention in generally referred to by the reference numeral 32 comprising a base portion 34 having an inner edge 36 and an outer edge 38. As seen in FIG. 2, inner edge 36 extends around and embraces the inner edge 40 of the horseshoe and is received by a recessed area or groove 42 formed in the horseshoe. The outer edge 38 extends upwardly adjacent the side 30 of the hoof 28. Base portion 34 has a V-shaped portion 44 which extends therefrom and which is received in the full ring 24. The base portion 34 has a nail opening 46 formed therein which extends through the V-shaped portion 44 to register with the nail opening 26 in the quarter portion of the horseshoe 10. Base portion 34 also has a notch 48 formed therein at its forward end which partially receives a nail which extends through one of the nail openings 26.

The numeral 50 refers to a lug which protrudes downwardly from base portion 34 at a location rearwardly of the nail opening 46. The longitudinal axis of the lug 50 is disposed substantially at a right angle to the longitudinal axis of the full ring 24. Lug 50 is provided with strengthening ribs 52 at opposite sides thereof.

The numeral 32' refers to an identical but opposite mud clip which is secured to the outside quarter portion of the horseshoe. Inasmuch as mud clip 32' is identical to mud clip 32, only mud clip 32 will be described in detail with "'" indicating identical structure on mud clip 32'.

The normal method of installation is as follows: Nail 54 is first removed from the horseshoe 10. Mud clip 32 is then slipped onto the shoe by extending the inner edge portion 36 around the inner edge portion 40 of the horseshoe 10. The mud clip 32 is then positioned with respect to the horseshoe so that the V-shaped portion 44 is received in the full ring 24 and so that the nail opening 46 registers with the nail opening 26 at the quarter portion of the horseshoe. The nail 54 is then replaced so as to extend through the opening 46, opening 26 and into the hoof 28 of the horse. The outer edge portion 38 is then bent from the position illustrated by solid lines in FIG. 2 to the position illustrated by broken lines in FIG. 2 so as to be closely adjacent the outside wall 30 of the hoof 28. The outer mud clip is then installed in an identical manner.

The relationship of the inner edge portion 36, nail 54, V-shaped portion 44 and the outer edge portion 36 insures that the mud clip will remain on the shoe during the use. The mud clip provides the necessary traction for the horse during muddy conditions. It can be seen that the mud clips are easily installed on the shoe without removing the entire shoe from the hoof of the animal. It is simply necessary to remove a single nail in each of the quarter portions of the shoe and to install the clips thereon. The clips are easily removed by simply removing the nails from the nail openings 46 and 46'. The nails can then be driven through the nail openings 26 until such time as the mud clips are again needed.

Thus it can be seen that a mud clip has been provided for a horseshoe which may be mounted on the horseshoe by means of a single nail. It can also be seen that a mud clip has been provided which has means thereon to positively maintain the same on the shoe. The mud clip of this invention is quickly and easily installed and accomplishes at least all of its stated objectives.

I claim:

1. In combination with a horseshoe having a substantially flat upper surface, a bottom surface having a full ring formed therein, and inner and outer edges, a mud clip comprising a base portion embracing the quarter portion of the horseshoe, said base portion having inner and outer edge portions, said inner edge portion of said base portion extending around and embracing the inner edge of the horseshoe, said outer edge portion of said base portion extending substantially upwardly from the horseshoe adjacent the side of the hoof of the horse,
a lug means protruding downwardly from said base portion,
and a nail extending through said base portion, said horseshoe, and into the hoof of the horse to maintain said base portion on said horseshoe.

2. The combination of claim 1 wherein a pair of mud clips are secured to the outer and inner quarter portions of said horseshoe.

3. The combination of claim 1 wherein said lug means is elongated and has its longitudinal axis disposed substantially at a right angle to the longitudinal axis of said full ring.

4. The combination of claim 3 wherein said lug means has strengthening ribs at the opposite sides thereof.

5. The combination of claim 1 wherein said base portion has a substantially V-shaped portion extending therefrom which is received in the full ring of the horseshoe.

6. The combination of claim 1 wherein the horseshoe has a recessed area formed therein adjacent its inner edge, said inner edge of said base portion being received in said recessed area.

7. The combination of claim 1 wherein a single nail extends through said base portion adjacent said lug.

8. The combination of claim 5 wherein said V-shaped portion has a nail opening formed therein for receiving a horseshoe nail therein.

* * * * *